United States Patent
Cho et al.

(10) Patent No.: US 8,145,270 B2
(45) Date of Patent: *Mar. 27, 2012

(54) SMART CARD AND METHOD FOR GENERATING RESPONSE MESSAGE TO BE DELIVERED TO MOBILE TERMINAL SUPPORTING MOBILE BROADCAST, AND MOBILE TERMINAL THEREFOR

(75) Inventors: Jeong-Sik Cho, Suwon-si (KR);
Young-Seop Han, Suwon-si (KR);
Young-Jip Kim, Suwon-si (KR);
Joon-Ho Park, Suwon-si (KR);
Byoung-Dai Lee, Seongnam-si (KR);
Tae-Soo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 684 days.

This patent is subject to a terminal disclaimer.

(21) Appl. No.: 12/260,692

(22) Filed: Oct. 29, 2008

(65) Prior Publication Data

US 2009/0143105 A1   Jun. 4, 2009

(30) Foreign Application Priority Data

Nov. 29, 2007  (KR) .......................... 10-2007-0122969

(51) Int. Cl.
*H04B 1/38* (2006.01)
*H04L 9/08* (2006.01)

(52) U.S. Cl. ........................................ 455/559; 380/284
(58) Field of Classification Search ................. 455/558, 455/559; 380/284

See application file for complete search history.

(56) References Cited

U.S. PATENT DOCUMENTS

2009/0316911 A1 * 12/2009 Cho et al. ..................... 380/284
2010/0027787 A1 *  2/2010 Benkert et al. ................. 380/45

FOREIGN PATENT DOCUMENTS

| KR | 1020060031848 | 4/2006 |
| KR | 100748470 | 8/2007 |
| KR | 1020070089027 | 8/2007 |

* cited by examiner

*Primary Examiner* — Joseph Chang
(74) *Attorney, Agent, or Firm* — The Farrell Law Firm, P.C.

(57) ABSTRACT

Provided is a method of efficiently processing a Short-Term Key Message (STKM) in the mobile broadcast supporting the mobile terminal. A structure of a response message according to processing the STKM in the smart card is also provided. In particular, a variety of information necessary for reproducing in the player is included in the response message and delivered to the mobile terminal, thereby the mobile terminal can easily obtain the desired information through the response message. Therefore, when the STKM is processed in the mobile terminal, there is no need to process operations except for a resending check, and the information does not need to be stored separately.

12 Claims, 5 Drawing Sheets

SMART CARD AND METHOD FOR GENERATING RESPONSE MESSAGE TO BE DELIVERED TO MOBILE TERMINAL SUPPORTING MOBILE BROADCAST, AND MOBILE TERMINAL THEREFOR

PRIORITY

This application claims priority under 35 U.S.C. § 119(a) to an application entitled "Smart Card and Method for Generating Response Message to be Delivered to Mobile Terminal Supporting Mobile Broadcast, and Mobile Terminal therefor" filed in the Korean Industrial Property Office on Nov. 29, 2007 and assigned Serial No. 2007-122969, the contents of which are hereby incorporated by reference.

BACKGROUND OF THE INVENTION

1. Field of the Invention

The present invention relates to a mobile broadcast system, and more particularly to a method of processing a short-term key message in a terminal supporting mobile broadcast, and a terminal therefor.

2. Description of the Related Art

The Open Mobile Alliance (OMA) group researches standards for interworking among individual mobile solutions, and specifies two profiles as a broadcast standard established to be used appropriately for broadcast environment. One of the profiles is a Digital Rights Management (DRM) profile, and the other is a smart card profile. In the smart card profile, a video/audio stream encrypted with specific keys is transmitted to a terminal over a broadcast network. Further, a data stream having keys necessary for decrypting the encrypted video/audio stream is also transmitted to the mobile terminal over the same broadcast network, which is referred to as a Short-Term Key Message (STKM).

In the smart card profile, the received STKM is subjected to a resending check by a Multimedia Internet KEYing (MIKEY) parser in the mobile terminal. Here, a Multimedia Broadcast/Multicast Service (MBMS) Traffic Key (MTK) included in the STKM is changed once every several seconds or minutes, and the STKM is transmitted every 0.5 seconds or every several seconds, thereby causing the mobile terminal to receive the same STKM several times or several tens of times until the key is updated once. Continuously performing a parsing and a key decryption every time the STKM is received results in a waste of mobile terminal resources. Therefore, as a method of reducing this resource waste, a resending check is essential.

Figure 1:
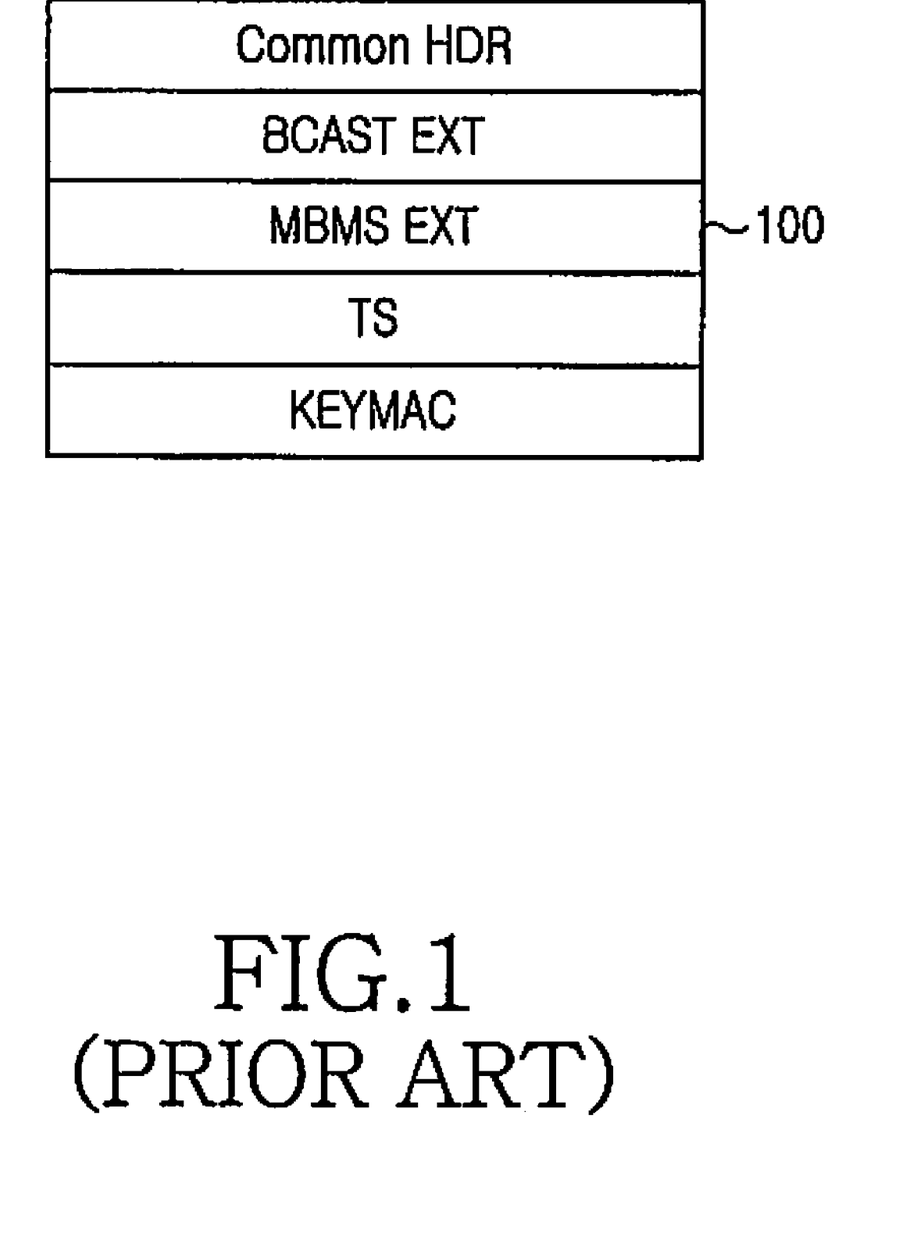
FIG. 1 is a diagram illustrating a conventional Multimedia Internet KEYing (MIKEY) message structure.

For the resending check, the STKM to be transmitted in a MIKEY message structure is used in the smart card profile. The MIKEY message structure is described as shown in FIG. 1 and the MTK is formatted by a simple binary encoding method, such as the MIKEY, in order to be transmitted. In particular, as a decision reference for the resending check, an MTK IDentification (ID) included in an MBMS EXT (Extension) 100 field in FIG. 1 is used.

Figure 2:
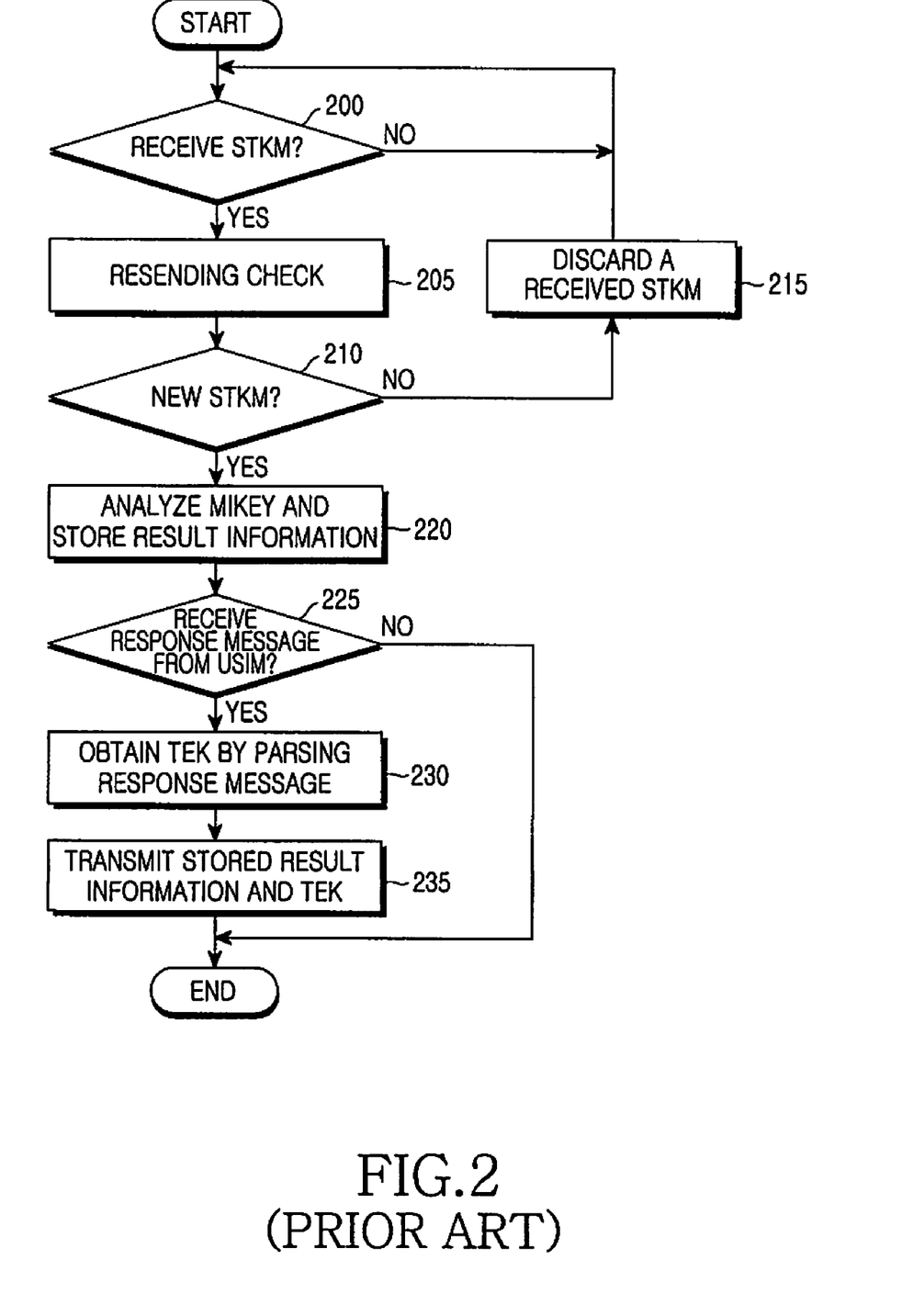
FIG. 2 is a operational flowchart illustrating a conventional resending check of a mobile terminal.

A procedure of the resending check will now be described with reference to FIG. 2. FIG. 2 shows an operational flowchart of a mobile terminal for a conventional resending check.

Referring to FIG. 2, the mobile terminal determines whether an STKM is received, in step 200. If the STKM is received, the mobile terminal performs the resending check in step 205, and determines whether the received STKM is a new STKM in step 210. If the received STKM is not a new STKM, the mobile terminal goes to step 215 and discards the received STKM. If the received STKM is a new message, a parsing and key decryption process is performed on the mobile terminal or the smart card according to a location of a secure function. The process is classified into a Generic Bootstrapping Architecture (GBA)-Mobile Equipment (ME) (GBA_ME) scheme or a GBA_Universal Subscriber Identity Module (USIM) (GBA_U) scheme according to whether a location for processing the STKM in the smart card profile is a mobile terminal or a USIM, i.e., a smart card. In the GBA_U scheme, the STKM is delivered to a USIM by an Application Protocol Data Unit (APDU) command, and then the parsing and key decryption process is performed within the USIM. Then, the MTK or a Traffic Encryption Key (TEK) included in the STKM is delivered again to the mobile terminal.

At this time, when a separate MIKEY parser is included in the mobile terminal for analyzing the STKM, the mobile terminal analyzes the MIKEY and stores the result information according to the analysis by performing the parsing operation, in step 220. Thereafter, the mobile terminal determines whether a response message is received from the USIM, in step 225. When the response message is received, the mobile terminal obtains the TEK by parsing the response message, in step 230. Subsequently, the mobile terminal delivers the stored result information and the TEK to a player, in step 235.

In the player, a variety of information is required for reproducing a video/audio stream. However, in the case of the GBA_U scheme, a variety of information is included in the STKM, but the USIM delivers the only TEK. Therefore, since the mobile terminal must perform the parsing operation by using the separate MIKEY parser and have the values in a memory, the parsing operation causes memory and resources in the mobile terminal to be wasted. Moreover, independently from the parsing and key decryption procedure within the USIM, redundant operations are unnecessarily performed in the mobile terminal by analyzing the MIKEY and by analyzing the result information, which increases the load on the mobile terminal.

SUMMARY OF THE INVENTION

Accordingly, the present invention has been made to solve the above-mentioned problems occurring in the prior art, and the present invention provides a smart card and a method for generating a response message to be delivered to a mobile terminal supporting mobile broadcast in order to smoothly perform memory management and resource management in the mobile terminal, and provides a mobile terminal therefor.

Also, the present invention provides a smart card and a method for generating a response message to be delivered to a mobile terminal supporting mobile broadcast, avoiding redundant operations of a USIM in the mobile terminal, and provides a mobile terminal therefor.

In accordance with an aspect of the present invention, there is provided a smart card which is inserted into a mobile terminal supporting mobile broadcast and which generates a response message according to short-term key message processing, the smart card including an information extraction unit for, when a Short-Term Key Message (STKM) is delivered from the mobile terminal, extracting information necessary for decrypting and reproducing broadcast service data from the STKM; and a response message generation unit for generating a response message including the extracted information and for delivering the response message to the mobile terminal.

In accordance with another aspect of the present invention, there is provided a mobile terminal into which a smart card is inserted and which processes a short-term key message, the mobile terminal including a receiving unit for receiving a Short-Term Key Message (STKM) over a broadcast network; a resending check unit for determining whether the received short-term key message is a new short-term key message, and delivering the received short-term key message to the smart card when the received short-term key message is a new short-term key message; and a decryption unit for obtaining information necessary for decrypting and reproducing broadcast service data from the response message by parsing the delivered response message when a response message is delivered from the smart card in response to delivery of the short-term key message.

In accordance with another aspect of the present invention, there is provided a method of generating a response message to be delivered to a mobile terminal supporting mobile broadcast in a smart card, the method including receiving a Short-Term Key Message (STKM) from the mobile terminal; extracting information necessary for decrypting and reproducing broadcast service data from the short-term key message; generating a response message including the extracted information; and delivering the response message to the mobile terminal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention provides a method of efficiently processing a Short-Term Key Message (STKM) in the mobile terminal supporting the mobile broadcast. For this purpose, the present invention provides an improved structure of a response message in processing the STKM in the smart card. Particularly, in the present invention, a variety of information necessary for reproducing in the player is included in the response message and delivered to the mobile terminal; thereby the mobile terminal can easily obtain the desired information through the response message. Therefore, when the STKM is processed in the mobile terminal, there is no need to process operations other than the resending check, and the information does not need to be stored separately.

First, reference will now be made in brief to information related to an encryption key used for service protection and contents protection in the mobile broadcast system and usage thereof according to an embodiment of the present invention. After the mobile terminal is registered as a service subscriber to use service and contents broadcasting from a broadcast system, when the mobile terminal subscribes a corresponding service, an STKM used for decrypting an actual encrypted service and contents can be obtained. This STKM includes a Traffic Encryption Key (TEK), which is encrypted with a Service Encryption and Authentication Key (SEAK) having an integrated format of a Service Encryption Key (SEK) with a Service Authentication Key (SAK) in order to protect the TEK, and a Message Authentication Code (MAC) function can be applied. In the future, this TEK will be used to decrypt actual encrypted services and contents.

Hereinafter, a smart card for generating a response message to be delivered to the mobile terminal supporting mobile broadcast and operations of the mobile terminal receiving the response message according to an embodiment of the present invention, will be described with reference to FIG. 3.

Figure 3:
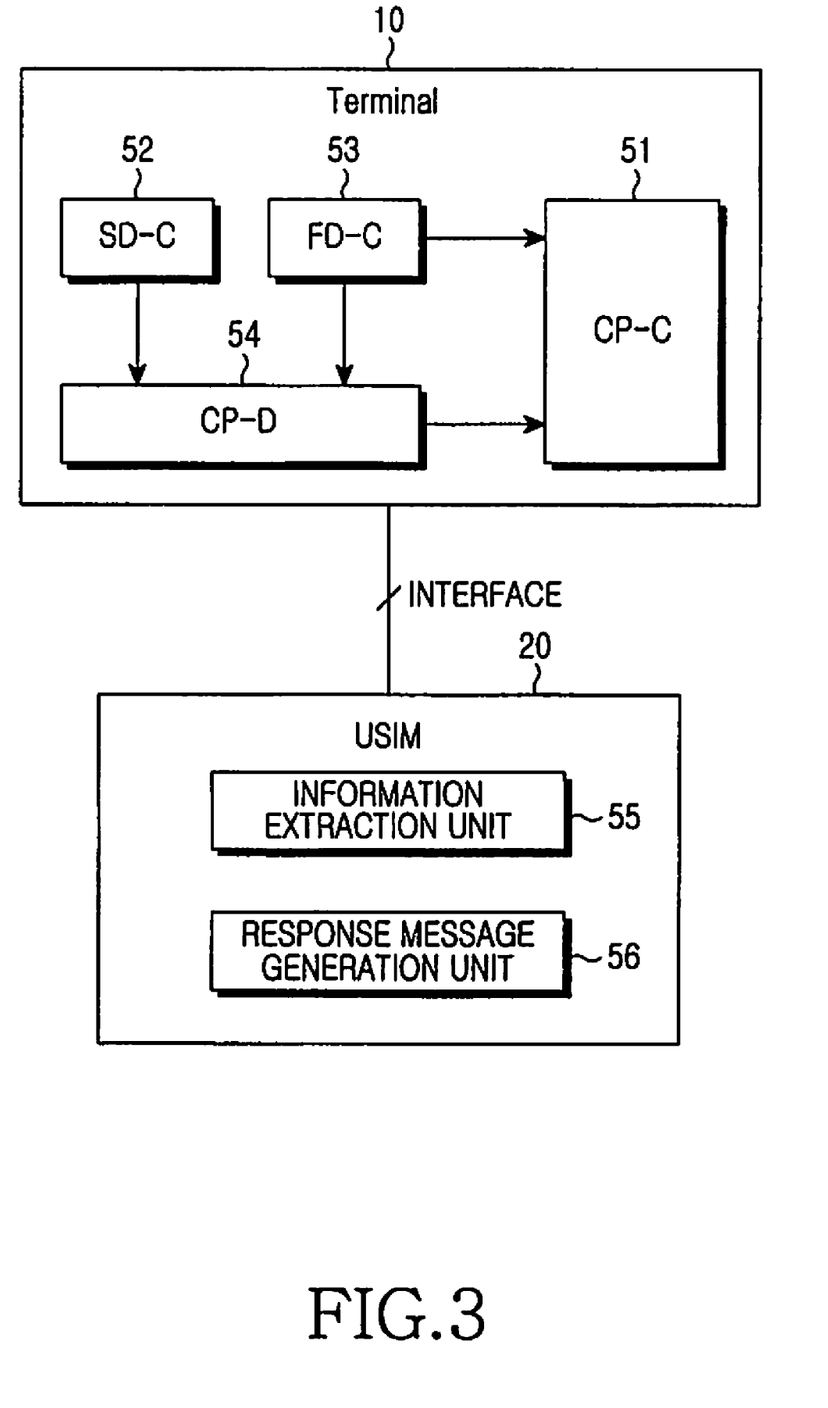
FIG. 3 is a structure diagram illustrating a mobile terminal and a smart card according to an embodiment of the present invention.

Referring to FIG. 3, the mobile terminal 10 receives encrypted broadcast services from a server managing BroadCAST (BCAST) services, and these broadcast service may include a video/audio broadcast service, a file download service, etc.

The mobile terminal 10 includes a Content Provider-Client (CP-C) 51, a Stream Distribution-Client (SD-C) 52, a File Distribution-Client (FD-C) 53, and a Content Provider-Decryption (CP-D) 54.

First, the SD-C component 52 acts as a receiving unit for contents broadcasted in an encrypted stream format, and delivers the received contents to the CP-D component 54 to be decrypted. Further, the FD-C component 53 also acts as a receiving unit, and delivers contents broadcasted in an encrypted file format to the CP-D component 54 for decryption. The CP-C component 51 performs registration and subscription, and by this registration and subscription the CP-C component 51 serves to obtain an encryption key necessary for decrypting the encrypted contents and to deliver it the CP-D component 54.

The mobile terminal 10 having the above structure can use the services by decrypting the encrypted contents with the TEK in the CP-D component 54 through the SD-C component 52 in case of the stream contents, or through the FD-C component 53 in case of the file contents.

According to the embodiment of the present invention, when the STKM generated by combining information necessary for decrypting and reproducing the broadcast service data, etc., is transmitted to the FD-C component 53 of the mobile terminal 10, the transmitted STKM is delivered to a resending check unit (not shown) in order to determine whether this STKM is a new STKM. When the transmitted STKM is a new STKM as the decision result, the resending check unit delivers the STKM to the USIM 20 through an interface.

The CP-D component 54, acting as a decryption unit corresponding to delivery of the STKM, serves to parse the response message from the USIM 20, and then obtains information necessary for decrypting and reproducing the broadcast service data from the response message. After obtaining the information necessary for decrypting and reproducing the broadcast service data, the CP-D component 54 uses the encryption key, such as the TEK, etc., to decrypt the broadcast service data, and uses other information to reproduce the broadcast service data in a stream format.

On the other hand, the USIM 20 has a structure such that the USIM 20 is inserted into the mobile terminal 20 through an interface, including an information extraction unit 55 and a response message generation unit 56. The information extraction unit 55 serves to obtain the information necessary for decrypting and reproducing the encrypted broadcast service data from the STKM delivered from the mobile terminal 10 through an interface. This information necessary for decrypting and reproducing the broadcast service data includes an MBMS Traffic Key (MTK) IDentification (ID) for identifying the MTK, MTK data, a terminal binding flag value for indicating whether the TEK must be decrypted with a Terminal Binding Key (TBK), a traffic authorization flag value for indicating whether there is included a MAC portion when the broadcast service data is received, and a traffic key lifetime. In addition, the response message generation unit 56 serves to generate the STKM-processed result, i.e., the response message including the above information, and to deliver the result to the mobile terminal 10 through an interface.

Figure 4:
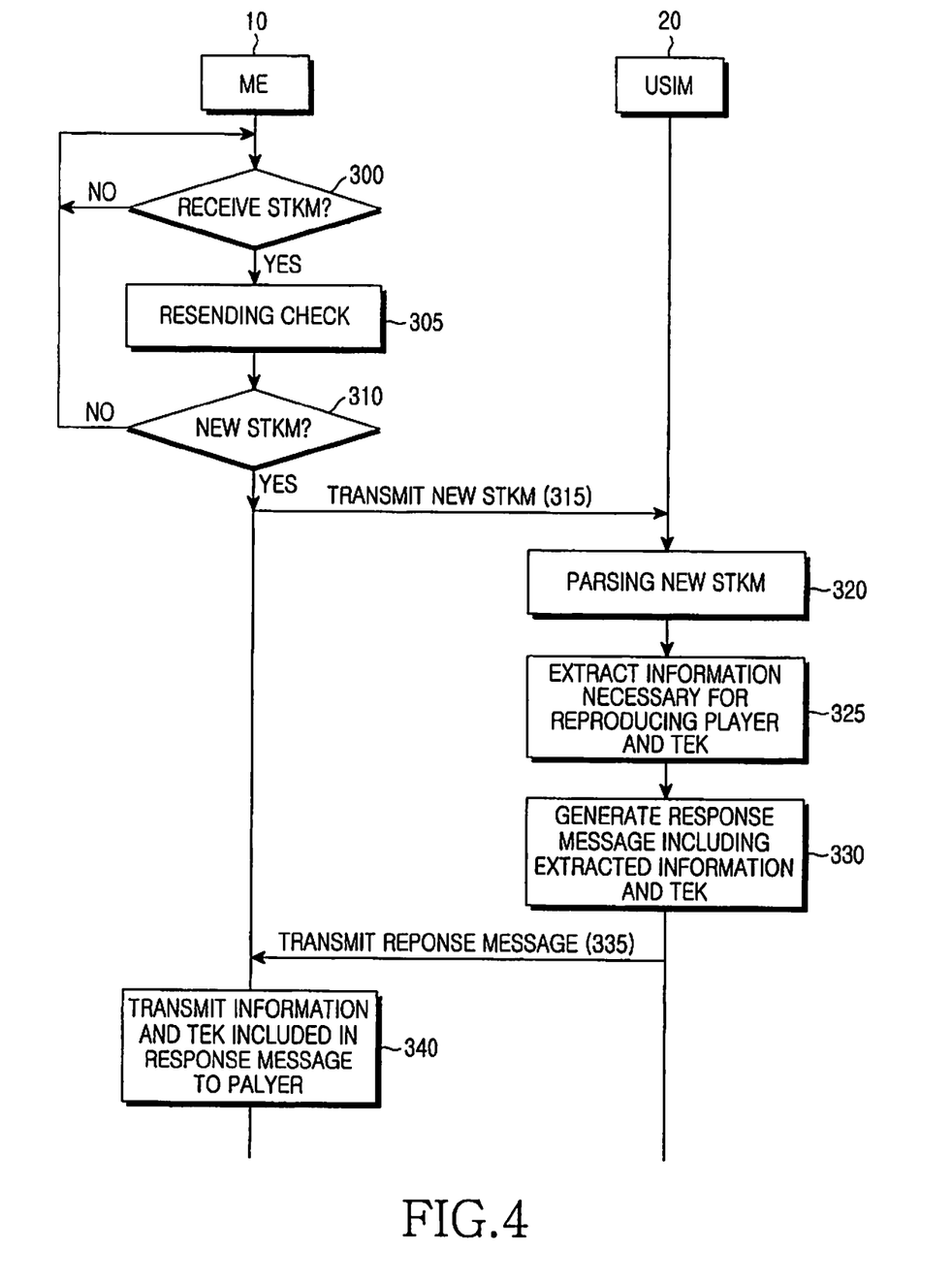
FIG. 4 is an operational flowchart between a mobile terminal and a smart card according to an embodiment of the present invention.

Hereinafter, operations between the mobile terminal and the smart card will now be described with reference to FIG. 4. In FIG. 4, the mobile terminal (hereinafter, Mobile Equipment (ME)) 10 is a terminal capable of receiving the BCAST service, and may be connected to a cellular network according to the mobile terminal performance. In the following description, it is assumed that the mobile terminal can connect to a cellular network. Further, in FIG. 4, as an example of a smart card that is inserted into the mobile terminal, the Universal Subscriber Identity Module (USIM) 20 will be described.

First, the ME 10 determines whether the STKM is received from a broadcast network, in step 300. When the STKM is received, the ME 10 determines, in step 310, whether the received STKM is a new STKM by performing a resending check, in step 305. More specifically, if an MTK ID included in the received STKM is less than or equal to a previous received MTK ID, the mobile terminal determines that the received STKM is not a new STKM. If the MTK ID is greater than the previous received MTK ID, the mobile terminal determines that the received STKM is a new STKM, thereby performing the resending check. As the result of the resending check, when the received STKM is determined to be a new message, the ME 10 delivers the new STKM to the USIM 20, in step 315.

Then, the USIM 20 parses the new STKM, in step 320. By performing parsing and decryption of this STKM, the USIM 20 extracts information necessary for decrypting and reproducing broadcast service data, in step 325. The MTK is also included in the extracted information. More specifically, because the STKM is delivered in a MIKEY message format, the USIM 20 parses the MIKEY message. Here, the MIKEY message includes the MTK, and if a salt key is available, the salt key is also included. When parsing this MIKEY message, the USIM 20 retrieves an MBMS Service Key (MSK) with a given MSK ID in an MBMS Extension field of the MIKEY message. If there is no necessary MSK, the USIM 20 determines that the MIKEY message processing is failed, and discards the MIKEY message.

Unlike the above case, if there is a necessary MSK, the USIM 20 extracts the MTK protected by the MSK, as well as the salt key (if the salt key is available) and broadcast services, i.e., the information necessary for decrypting and reproducing a video/audio stream from the MIKEY message. By this extraction, the USIM 20 performs an MBMS Generation and Validation Function (MGV-F), using the MSK. When this MGV-F procedure is successful, the USIM 20 extracts the MTK from the MIKEY message. At this time, the USIM 20 stores other parameters, such as a key lifetime, an MTK ID extracted from the MIKEY message, etc.

Therefore, when information necessary for decrypting and reproducing broadcast service data is extracted through the MIKEY message parsing, the USIM 20 generates a response message including the extracted information, in step 330. In other words, the response message indicates that the USIM 20 processes the STKM delivered from the ME 10 in accordance with the GBA_U (Generic Bootstrapping Architecture_USIM) scheme.

When the USIM 20 delivers the generated response message to the ME 10, in step 335, the ME 10 performs decryption and reproduction of broadcast service data by using information included in the response message, in step 340, i.e., the ME 10 decrypts the broadcast service data and delivers information necessary for reproducing data to the player in order to reproduce the broadcast service in the player.

In this manner, since the ME 10 can obtain the MTK as well as a variety of information from the USIM 20 without a separate MIKEY parser, there is no need to parse the MIKEY message without overlapping with the USIM 20, and no need to store the result information according to the parsing.

Figure 5:
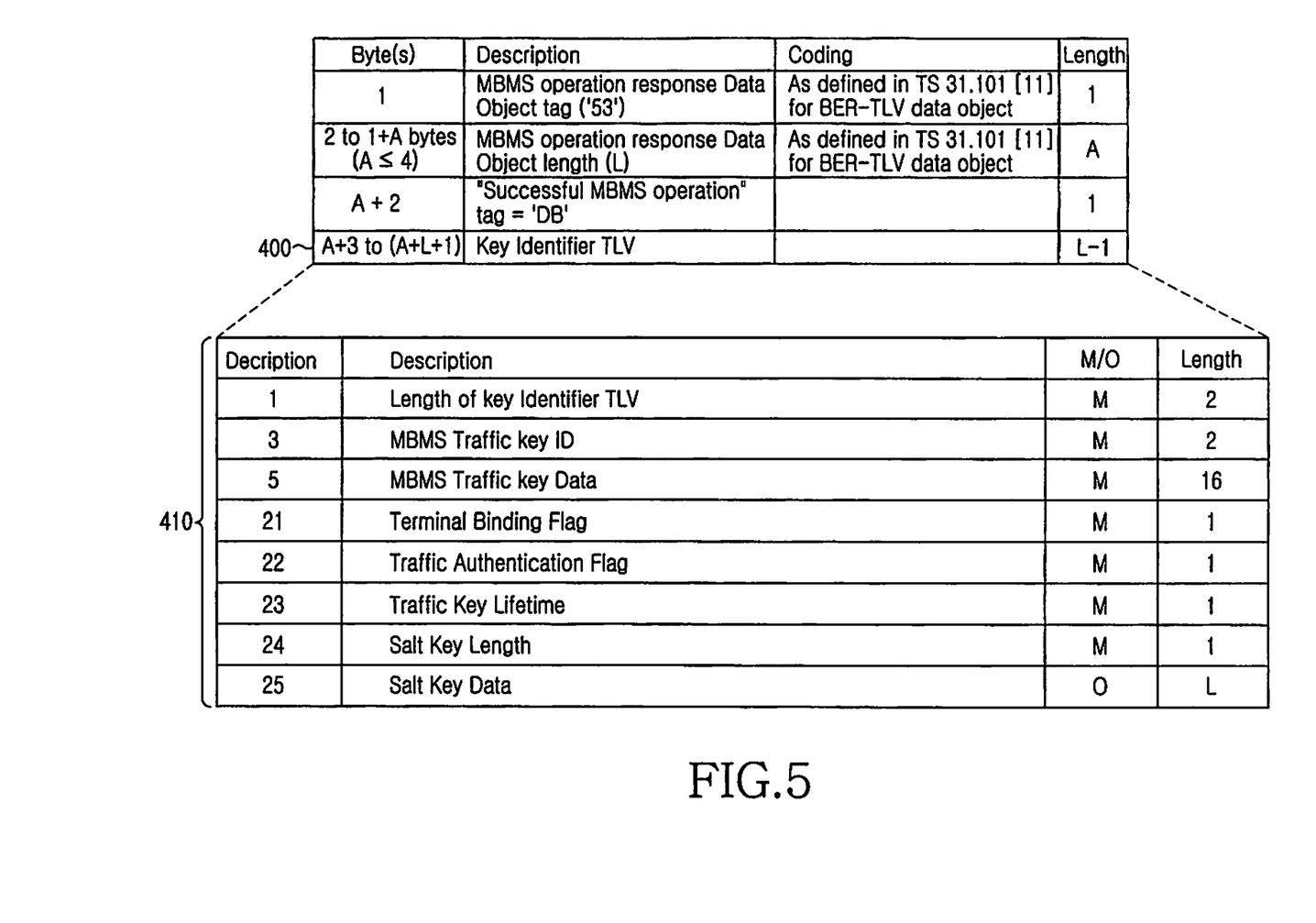
FIG. 5 is an exemplary diagram illustrating a Universal Subscriber Identity Module (USIM) response message structure according to an embodiment of the present invention.

The structure of the response message to be delivered to the mobile terminal is illustrated as shown in FIG. 5. FIG. 5 is an exemplary diagram illustrating a USIM response message structure according to an embodiment of the present invention, newly proposing the response message structure specified in $3^{rd}$ Generation Partnership Project (3GPP) 31.102.v780.

Referring to FIG. 5, the present invention provides a new structure of the response message in which, in addition to the TEK, broadcast service data, i.e., a variety of information necessary for decrypting and reproducing a video/audio stream (e.g., a traffic authorization flag value, a key lifetime, etc.) is included.

As shown in FIG. 5, the response message schema table will be described below. The "Description" column indicates a meaning of a corresponding element or an attribute value, and the "Coding" column indicates the type of a corresponding element or an attribute value.

FIG. 5 shows a field structure sequentially illustrating the response message defined according to the present invention, together with descriptions of each field of the response message. In the structure of this response message, the response message includes a one-byte tag field for indicating a response message on an MBMS operation, a field for indicating an entire length of the response message, a one-byte field for indicating that the MBMS operation is successful, and a key identifier TLV field to be inserted with a variety of actual information. A tag value of 53 is used for the tag field of the above fields in order for the ME 10 to identify the message delivered from the USIM 20 as a response message. Further, the tag field and the field for indicating the entire length are encrypted with a Basic Encoding Rules (BER)-Tag Length Value (TLV) data object.

In particular, key identifier TLV field indicated by reference number 400 has the same structure as that of reference number 410, and is inserted with a variety of information, such as an MTK, a traffic authorization flag value, and a key lifetime, in a TLV format. This information is included in the STKM, and specifically, in the BCAST extension field or in other fields of the MIKEY message structure. Therefore, when the STKM delivered from the ME 10 is parsed and analyzed in the USIM 20, after extracting corresponding information from each field, the extracted information is gathered and included in the response message in an identical structure as shown in reference number 410.

The schema table 410 of the key identifier TLV field 400 will be described below. The "Byte(s)" column indicates a location of corresponding element value or an attribute value; the "Length" column indicates a size of a corresponding element value or an attribute value; and the "M/O" column is used to determine whether a corresponding element value or an attribute value is an essential content. If the value is an essential content, the 'M' value is used, and if not, i.e., if the value is optional, the 'O' value is used.

This response message structure includes "Length of key Identifier TLV" for indicating a sum of length of all information included in an actual key identifier TLV field 400, "MBMS Traffic Key ID" for identifying the MTK, "MBMS Traffic Key data" for indicating an actual MTK, "Terminal Binding Flag" for indicating whether the TEK is decrypted with the Terminal Binding Key (TBK), "Traffic Authentication Flag" for indicating whether a MAC portion is included when a video/audio stream is received, "Traffic Key Lifetime" for indicating the traffic key lifetime, "Salt Key Length" for indicating a length of the salt key when the salt key is available, and "Salt Key Data" for indicating an actual salt key, etc.

When the response message having the above-mentioned structure is received, the mobile terminal controls decryption of a video/audio stream by using a variety of information necessary for the MTK and player as well as reproduction by a player. Therefore, in the existing mobile terminal, information necessary for decrypting and reproducing a video/audio stream is parsed and analyzed from the STKM in advance, and the STKM is then delivered to the USIM. However, in the present invention, simply the mobile terminal only processes the resending check and the response message. As described above, according to the present invention, the same processing procedures in both the mobile terminal and the USIM, that is, the procedures of key decryption after parsing and analyzing the STKM, can be prevented from being carried out repeatedly.

According to the present invention, in the smart card profile GBA_U scheme, there is an advantage in that the procedures of parsing, analyzing, and key-decrypting the STKM can be prevented from being carried out repeatedly. Further, according to the present invention, since the mobile terminal only processes the response message from the USIM, a processing load on the mobile terminal can be reduced. Further, since there is no need to store the parsing and analyzing results in a separate memory, memory can be prevented from being used uselessly.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A smart card which is inserted into a mobile terminal supporting mobile broadcast, and which generates a response message according to a short-term key message process, the smart card comprising:
    an information extraction unit for, when a Short-Term Key Message (STKM) is delivered from the mobile terminal, extracting information necessary for decrypting and reproducing broadcast service data from the STKM; and
    a response message generation unit for generating a response message including the extracted information and for delivering the response message to the mobile terminal.

2. The smart card as claimed in claim 1, wherein the response message comprises:
    a tag field for indicating a response message on a Multimedia Broadcast/Multicast Service (MBMS) operation;
    a field for indicating an entire length of the response message;
    a field for indicating that the MBMS operation is successful; and
    a field to be inserted with the extracted information.

3. The smart card as claimed in claim 2, wherein the field to be inserted with the extracted information comprises:
    a field for indicating a sum of length of the extracted information;
    a field for identifying an MBMS Traffic Key (MTK);
    a field for indicating an actual MTK;
    a field for indicating whether the Traffic Encryption Key (TEK) is decrypted with the Terminal Binding Key (TBK);
    a field for indicating whether a Message Authentication Code (MAC) portion is included when the broadcast service data is received; and
    a field for indicating a traffic key lifetime.

4. The smart card as claimed in claim 3, wherein the field to be inserted with the extracted information further comprises a field for indicating a length of a salt key when the salt key is available, and a field for indicating an actual salt key.

5. The smart card as claimed in claim 1, wherein the smart card comprises a Universal Subscriber Identity Module (USIM).

6. The smart card as claimed in claim 1, wherein the response message indicates a result of processing the short-term key message of the smart card in accordance with a Generic Bootstrapping Architecture (GBA)_Universal Subscriber Identity Module (USIM) (GBA_U) scheme.

7. A mobile terminal into which a smart card is inserted and which processes a short-term key message, the mobile terminal comprising:
    a receiving unit for receiving a Short-Term Key Message (STKM) over a broadcast network;
    a resending check unit for determining whether the received short-term key message is a new short-term key message, and delivering the received STKM to the smart card when the received STKM is a new STKM; and
    a decryption unit for obtaining information necessary for decrypting and reproducing broadcast service data from the response message by parsing the delivered response message when a response message is delivered from the smart card in response to delivery of the STKM.

8. The mobile terminal as claimed in claim 7, wherein the response message comprises:
    a tag field for indicating a response message on a Multimedia Broadcast/Multicast Service (MBMS) operation;
    a field for indicating an entire length of the response message;
    a field for indicating that the MBMS operation is successful; and
    a field to be inserted with information necessary for decrypting and reproducing the broadcast service data.

9. The mobile terminal as claimed in claim 7, wherein the information necessary for decrypting and reproducing the broadcast service data comprises at least one of:
    an MBMS traffic key IDentification (ID) for identifying an MBMS Traffic Key (MTK);

MTK data;

a terminal binding flag value for indicating whether a Traffic Encryption Key (TEK) must be decrypted with a Terminal Binding Key (TBK);

a traffic authorization flag value for indicating whether a Message Authentication Code (MAC) portion is included when the broadcast service data is received; and a traffic key lifetime.

10. A method of generating a response message to be delivered to a mobile terminal supporting mobile broadcast in a smart card, the method comprising the steps of:

receiving a Short-Term Key Message (STKM) from the mobile terminal;

extracting information necessary for decrypting and reproducing broadcast service data from the STKM;

generating a response message including the extracted information; and delivering the response message to the mobile terminal.

11. The method as claimed in claim 10, wherein the response message comprises:

a tag field for indicating a response message for a Multimedia Broadcast/Multicast Service (MBMS) operation;

a field for indicating an entire length of the response message;

a field for indicating that the MBMS operation is successful; and a field to be inserted with the extracted information.

12. The method as claimed in claim 11, wherein the field to be inserted with the extracted information comprises:

a field for indicating a sum of length of the extracted information;

a field for identifying an MTK;

a field for indicating an actual MTK;

a field for indicating whether a TEK must be decrypted with a TBK;

a field for indicating whether a Message Authentication Code (MAC) portion is included when the broadcast service data is received; and a field for indicating a traffic key lifetime.

* * * * *